United States Patent
Hollingsworth et al.

(10) Patent No.: US 11,725,268 B2
(45) Date of Patent: Aug. 15, 2023

(54) METHOD TO INCREASE THE THERMAL STRESS CAPABILITY OF A POROUS CERAMIC COATING AND A LAYER SYSTEM

(71) Applicant: Siemens Energy Global GmbH & Co. KG, Bayern (DE)

(72) Inventors: Peter Stuart Hollingsworth, Dortmund (DE); Alexandr Sadovoy, Berlin (DE); Dimitrios Zois, Berlin (DE)

(73) Assignee: Siemens Energy Global GmbH & Co. KG, Bayern (DE)

( * ) Notice: Subject to any disclaimer, the term of this patent is extended or adjusted under 35 U.S.C. 154(b) by 164 days.

(21) Appl. No.: 17/282,295

(22) PCT Filed: Jun. 14, 2019

(86) PCT No.: PCT/EP2019/065656
§ 371 (c)(1),
(2) Date: Apr. 1, 2021

(87) PCT Pub. No.: WO2020/074139
PCT Pub. Date: Apr. 16, 2020

(65) Prior Publication Data
US 2021/0340677 A1    Nov. 4, 2021

(30) Foreign Application Priority Data
Oct. 12, 2018   (EP) ........................ 8200072

(51) Int. Cl.
*C23C 28/00*    (2006.01)
*C23C 4/18*     (2006.01)
*C23C 4/134*    (2016.01)
*C04B 38/00*    (2006.01)
*C04B 41/00*    (2006.01)
(Continued)

(52) U.S. Cl.
CPC ............ *C23C 4/18* (2013.01); *C04B 38/0074* (2013.01); *C04B 41/0081* (2013.01); *C23C 4/02* (2013.01); *C23C 4/11* (2016.01); *C23C 4/134* (2016.01)

(58) Field of Classification Search
CPC .. C23C 4/18; C23C 4/11; C23C 4/134; C23C 4/02
See application file for complete search history.

(56) References Cited

U.S. PATENT DOCUMENTS

2016/0281206 A1* 9/2016 Bilhe ..................... C23C 4/129
2017/0159164 A1* 6/2017 Huang ..................... C23C 4/18

FOREIGN PATENT DOCUMENTS

FR            3013360 A1     5/2015

OTHER PUBLICATIONS

PCT International Search Report and Written Opinion of International Searching Authority dated Aug. 7, 2019 corresponding to PCT International Application No. PCT/EP2019/065656 filed Jun. 14, 2019.

* cited by examiner

*Primary Examiner* — Nathan T Leong
(74) *Attorney, Agent, or Firm* — Wolter Van Dyke Davis, PLLC

(57) ABSTRACT

A method to increase the thermal stress capability of a porous TBC and layer system. Due to a post treatment step to a pose TBC coating cracks are produced inside the post TBC advantages manner to increase the thermal stress capability of the ceramic coating by only heating the surface of the ceramic coating.

20 Claims, 1 Drawing Sheet

(51) Int. Cl.
*C23C 4/02* (2006.01)
*C23C 4/11* (2016.01)

METHOD TO INCREASE THE THERMAL STRESS CAPABILITY OF A POROUS CERAMIC COATING AND A LAYER SYSTEM

CROSS REFERENCE TO RELATED APPLICATIONS

This application is the US National Stage of International Application No. PCT/EP2019/065656 filed 14 Jun. 2019, and claims the benefit thereof. The International Application claims the benefit of European Application No. EP18200072 filed 12 Oct. 2018. All of the applications are incorporated by reference herein in their entirety.

FIELD OF INVENTION

The invention relates to a method to increase the thermal stress capability of a porous TBC and layer system.

BACKGROUND OF INVENTION

Thermal Barrier Coatings (TBCs) are widely used on hot-gas-path metallic parts of Land-based Gas Turbines (LGTs) as well as of aero turbines in order to protect them from the excessive temperature that commonly exceeds the melting point of the metallic alloys. The most resilient TBCs present a columnar microstructure that allows the coating to expand relatively freely accommodating any stress generated either from the Coefficient of Thermal Expansion (CTE) mismatch between the ceramic coating and the underlying metallic part or from the thermal gradient along the coating's thickness. The most well-known coatings deposited with this characteristic microstructure are the EB-PVD deposited partially stabilized YSZ, with an exceptional thermal strain capability and the Segmented partially stabilized YSZ deposited with Air Plasma Spraying (APS), with the former being a much more expensive option than the latter. Thus, the segmented coatings are typically used in the large land-based gas turbines and the EB-PVDs in the aero or aeroderivative turbines. However, the segmented, being a less costly option, they are still more expensive compared to the typical porous thermal sprayed ceramic coatings. The reason is the more expensive torches required or the more frequent replace rate of hardware as well as the need for a tight temperature control that is required to generate the columnar microstructure during the spraying. The columnar microstructure presents itself as vertical cracks when looking at the coating's cross section, which has given to this type of thermal spray coatings also the name Dense Vertical Cracked (DVCs).

Until now, on the parts sprayed for LGTs, the segmented coatings have been deposited with the developed method associated with the higher cost of equipment and process.

SUMMARY OF INVENTION

It is therefore aim of the invention to overcome the problem mentioned above.

The problem is solved by a method and a layer system according to the independent claims.

In the dependent claims further advantages are listed which can be arbitrarily combined which each other to yield further advantages.

DETAILED DESCRIPTION OF INVENTION

Figure 1:
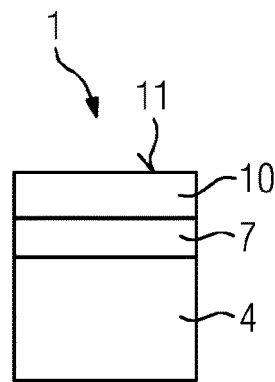
FIGS. 1, 3 shows a component and
FIG. 2 how to produce cracks in the coating.

The figures and the description are only examples of the invention.

It is suggested to generate vertical cracks after the deposition of the coating and that can be achieved by following up with a specialized heat treatment process. This method can be applied additionally on porous coatings, allowing in such a manner the combination of better thermal protection, as a result of the porous microstructure, with a columnar microstructure which can significantly increase the thermally related strain capacity of the coating, increasing thus its temperature of operation and its overall life expectancy.

The principle that the heat treatment is based on is rather simple. After its deposition the coating is typically characterized by internal porosity. A heat source can be applied on the coating side bringing its surface temperature at over 1273K for long enough time in order to allow the ceramic coating to start sinter gradually from its surface towards the metal substrate. It is important that the heating rate is kept small in the order of less than 50 K/s in order to prevent the formation of any horizontal cracks in the coating as a result of a much faster expanding ceramic coating compared to a still cooler metallic substrate. The residence time in the high temperature should be long enough to allow sintering to occur in the coating at a certain degree. That will manifest itself with the disappearance of the finest pores and some of the fine splat boundaries close to the surface of the coating that is closer to the heat source. The residence time is related to the applied heat input, with higher heat input demanding less residence time to induce sintering.

The heat source can be the plasma burner itself which can be used post spraying, to scan the part to allow a relatively even temperature to be brought on the coating surface. Prerequisite is that the powder feed would be shut down, in order to avoid any additional coating deposition.

Alternatively, a laser beam can be used as the heat source. Following its exposure to high temperature, the coating should be cooled rapidly with the use of forced cooled air directed on the coating side. In this manner, the coating will shrink faster than the still hotter metal substrate, setting it under tensile stress. As the coating will have gone through sintering, which will have increased its Young's modulus, inevitably it will reach rapidly its fracture point and vertical cracks will be generated alleviating in this manner the built-up stress. The depth or frequency of vertical cracks can be adjusted by manipulating the heat rate, residence time and cooling rate.

Steps to create Vertical Cracks in a deposited porous ceramic coating:

1. Spray the component with the ceramic coating using a plasma torch. The coating may or may not exhibit especially the typical porous microstructure.
2. The part can be cooled down by channeling forced cooling into its interior.
3. After it is cooled down, the forced cooling into its interior can be maintained on.
4. Employ a thermal camera or any other device to monitor the temperature of the coating at the next steps.
5. With a laser or a plasma torch heat up the coating on the sprayed component with maintaining the temperature raise rate less than 50 K/s, to minimize any horizontal cracks due to a fast-expanding hot coating on a much colder substrate. During the heat up the forced cooling in the components interior remains on.

6. After the coating on the component is brought overall in a temperature over 600° C., the heat source can be focused on the section(s) of the components that the coating needs to present high thermal strain capacity, e.g. leading edge, suction side, pressure side etc.

7. The temperature over the section of interest should be brought ideally up to a temperature between 1000° C. and 1500° C., especially 1300° C. to 1500° C., in order to initiate the sintering of the ceramic coating. Again, the temperature is to be raised with a 50 K/s max. rate.

8. After achieving the desired temperature, it should be maintained for time between 5 min and 2 hours or 15 min to 2 hours in order to allow the sintering process to take place from outside (coating rim) towards the interior of the part.

9. When the desired exposure time is achieved, remove the heating device and immediately initiate forced cooling from the coating side and kill the forced cooling from the interior. This will lead to faster shrinking of the coating compared to the substrate, which will build tensile stress along its thickness and will create the vertical cracks.

The depth and frequency of vertical cracks can be adjusted by manipulating heat rate, residence time and cooling rate.

Advantages:

The process can be brought in the thermal spray booth where the parts are sprayed. No need for additional capital investments.

The process can be retrofitted to already sprayed coatings.

The process can be brought to follow the deposition of standard porous coatings, which are typically cheaper compared to segmented coatings.

The porous coatings achieve better thermal protection compared to the segmented, allowing thinner coatings and thus faster spraying on each part, which means reduced cost per part.

FIG. 1 shows a component 1 with a substrate 4, which is especially metallic and very especially a nickel or cobalt based superalloy on which a bond coat 7, especially a metallic bond coat 7, very especially a NiCoCrAlY bond coat, is applied on, which produces a TGO (Thermal Grown Oxid layer) at least during operation.

Yttrium (Y), Tantalum (Ta), Rhenium (Re), Iron (Fe) and/or Silicon (Si), especially only Yttrium (Y).

On top of this bond coat 7 or substrate 4 a ceramic coating 10 with a certain porosity is applied on.

The porosity of the ceramic coating 10 is advantageously 8% to 22%.

Figure 2:
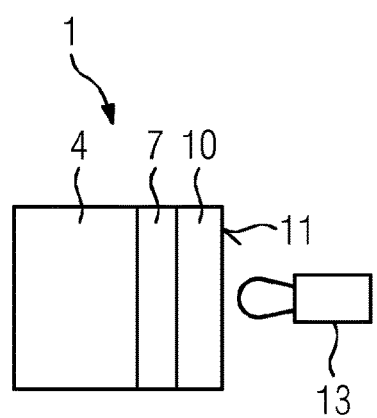
Figure 3:
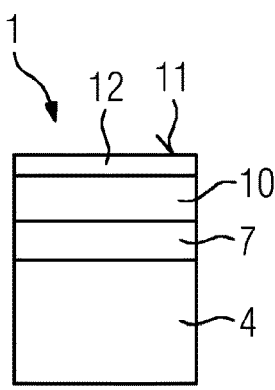

FIG. 2 shows a component 1 according to FIG. 1, wherein external heater 13, which can be a spray gun, a laser or any heating device, which heats up the surface 11 of the component 1 which to produces the cracks as described above, because a sintered rim 12 is produced (FIG. 3).

The invention claimed is:

1. A method to produce cracks into a porous ceramic coating in order to increase a thermal stress capability of the ceramic coating, the method comprising:
   coating or providing a component with a porous ceramic coating, wherein the ceramic coating shows no or almost no vertical microcracks, wherein the component comprises a substrate and a bond coat, and the ceramic coating is on the bond coat,
   heating up in a first step an outer surface of the ceramic coating to form a sintered rim of the ceramic coating that defines the outer surface of the ceramic coating, and
   force cooling in a final step the sintered rim and the ceramic coating to produce vertical cracks in the sintered rim.

2. The method according to claim 1,
   wherein a porosity of the ceramic coating is 8% to 22%.

3. The method according to claim 2,
   wherein after the coating step the component is force cooled from inside and heated up with a rate≤50 K/s, wherein the cooling from inside is maintained.

4. The method according to claim 3,
   wherein a temperature of the ceramic coating is raised until a high temperature is between 1000° C. and 1500° C.

5. The method according to claim 4,
   wherein the high temperature is maintained for a residence time from 5 min to 2 hours, in order to allow a sintering process to occur.

6. The method according to claim 5,
   wherein the high temperature is maintained for the residence time from 15 min to 2 hours.

7. The method according to claim 4,
   wherein the temperature of the ceramic coating is raised until the high temperature is between 1300° C. and 1500° C., with a heating rate of max 50 K/s.

8. The method according to claim 3,
   wherein the component is force cooled until a low temperature of 600° C.

9. The method according to claim 1,
   wherein a material of the ceramic coating is a zirconia based.

10. The method according to claim 9,
    wherein the material of the ceramic coating comprises a partially or fully stabilized zirconia (ZrO2).

11. The method according to claim 1,
    wherein the component is force cooled from inside after the coating step.

12. The method according to claim 1,
    wherein a heat source, or a laser or a plasma burner is used to heat up the ceramic coating at the outer surface.

13. The method according to claim 1,
    wherein the heating up to sintering step is directly performed after the coating step, in the same equipment.

14. The method according to claim 13, further comprising:
    cooling an inside of the component prior to the force cooling in the final step; and
    ceasing cooling the inside of the component during the force cooling in the final step;
    wherein the sintered rim is force cooled from outside during the force cooling in the final step.

15. The method according to claim 1
    wherein a heat source is focused on a section of the ceramic coating where the ceramic coating is required to demonstrate high thermal strain capacity.

16. The method according to claim 15,
    wherein the heat source is focused on the section(s) of the ceramic coating where the ceramic coating is required to demonstrate the high thermal strain capacity, comprising a leading edge, a suction side, and/or a pressure side of a turbine blade or vane.

17. The method according to claim 1,
    wherein a thermal camera or other monitoring device is used to monitor a temperature of the ceramic coating.

18. The method according to claim 1,
wherein a depth and a frequency of the vertical cracks are adjusted by manipulating a heat rate, a residence time and/or a cooling rate.
19. The method according to claim 1,
wherein the substrate comprises a metallic substrate, and/or
wherein the bond coat comprises a metallic bond coat.
20. The method according to claim 1,
wherein the heating up comprises heating up for several minutes up to 2 hours.

* * * * *